United States Patent
Yagoub et al.

(10) Patent No.: US 7,664,778 B2
(45) Date of Patent: Feb. 16, 2010

(54) SQL TUNING SETS

(75) Inventors: Khaled Yagoub, San Mateo, CA (US); Benoit Dageville, Foster City, CA (US); Mohamed Ziauddin, Pleasanton, CA (US); Karl Dias, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 304 days.

(21) Appl. No.: 10/936,449

(22) Filed: Sep. 7, 2004

(65) Prior Publication Data

US 2005/0125393 A1  Jun. 9, 2005

Related U.S. Application Data

(60) Provisional application No. 60/500,490, filed on Sep. 6, 2003.

(51) Int. Cl.
G06F 7/00 (2006.01)
G06F 17/00 (2006.01)

(52) U.S. Cl. .................. 707/103 R; 707/1; 707/2; 707/3; 707/7; 707/103 Y

(58) Field of Classification Search ............ 707/103, 707/1, 2, 3, 7, 103 R, 103 Y
See application file for complete search history.

(56) References Cited

U.S. PATENT DOCUMENTS

| | | | |
|---|---|---|---|
| 5,140,685 A | 8/1992 | Sipple et al. | |
| 5,260,697 A | 11/1993 | Barrett et al. | |
| 5,398,183 A | 3/1995 | Elliott | |
| 5,408,653 A | 4/1995 | Josten et al. | |
| 5,481,712 A | 1/1996 | Silver et al. | |
| 5,504,917 A | 4/1996 | Austin | |
| 5,544,355 A | 8/1996 | Chaudhuri et al. | |
| 5,577,240 A | 11/1996 | Demers et al. | |
| 5,634,134 A | 5/1997 | Kumai et al. | |
| 5,724,569 A * | 3/1998 | Andres ................. | 707/2 |
| 5,737,601 A | 4/1998 | Jain et al. | |
| 5,761,660 A | 6/1998 | Josten et al. | |
| 5,765,159 A | 6/1998 | Srinivasan | |
| 5,781,912 A | 7/1998 | Demers et al. | |
| 5,794,227 A | 8/1998 | Brown | |
| 5,794,229 A | 8/1998 | French et al. | |
| 5,806,076 A | 9/1998 | Ngai et al. | |
| 5,860,069 A | 1/1999 | Wright | |

(Continued)

OTHER PUBLICATIONS

Avnur, R. et al. "Eddies: Continuously Adaptive Query Processing" Proceedings of the 2000 ACM SIGMOD International Conference on Management of Data (SIGMOD '00), Dallas, TX, May 15-18, 2000, pp. 261-272.

(Continued)

Primary Examiner—Tim T. Vo
Assistant Examiner—Jay A Morrison
(74) Attorney, Agent, or Firm—Vista IP Law Group, LLP.

(57) ABSTRACT

A method and system for storing one or more database query language statements and performance information for each query language statement as a persistent database object. In one or more embodiments, the method and system stores the resource intensive statements and the performance information for each resource intensive statement as a second persistent database object.

21 Claims, 3 Drawing Sheets

U.S. PATENT DOCUMENTS

| | | | |
|---|---|---|---|
| 5,870,760 | A | 2/1999 | Demers et al. |
| 5,870,761 | A | 2/1999 | Demers et al. |
| 5,940,826 | A | 8/1999 | Heideman et al. |
| 5,963,933 | A | 10/1999 | Cheng et al. |
| 5,963,934 | A | 10/1999 | Cochrane et al. |
| 5,991,765 | A | 11/1999 | Vethe |
| 6,052,694 | A * | 4/2000 | Bromberg .................. 707/200 |
| 6,122,640 | A | 9/2000 | Pereira |
| 6,195,653 | B1 * | 2/2001 | Bleizeffer et al. ............. 707/2 |
| 6,212,514 | B1 * | 4/2001 | Eberhard et al. ............... 707/2 |
| 6,275,818 | B1 | 8/2001 | Subramanian et al. |
| 6,321,218 | B1 * | 11/2001 | Guay et al. .................... 707/2 |
| 6,330,552 | B1 | 12/2001 | Farrar et al. |
| 6,349,310 | B1 | 2/2002 | Klein et al. |
| 6,353,818 | B1 | 3/2002 | Carino, Jr. |
| 6,356,889 | B1 * | 3/2002 | Lohman et al. ................ 707/2 |
| 6,366,901 | B1 | 4/2002 | Ellis |
| 6,366,903 | B1 | 4/2002 | Agrawal et al. |
| 6,374,257 | B1 | 4/2002 | Guay et al. |
| 6,397,207 | B1 * | 5/2002 | Bleizeffer et al. ............. 707/2 |
| 6,397,227 | B1 | 5/2002 | Klein et al. |
| 6,434,545 | B1 * | 8/2002 | MacLeod et al. ............... 707/3 |
| 6,434,568 | B1 | 8/2002 | Bowman-Amuah |
| 6,442,748 | B1 | 8/2002 | Bowman-Amuah |
| 6,460,027 | B1 | 10/2002 | Cochrane et al. |
| 6,460,043 | B1 | 10/2002 | Tabbara et al. |
| 6,493,701 | B2 | 12/2002 | Ponnekanti |
| 6,496,850 | B1 | 12/2002 | Bowman-Amuah |
| 6,513,029 | B1 | 1/2003 | Agrawal et al. |
| 6,529,901 | B1 | 3/2003 | Chaudhuri et al. |
| 6,560,606 | B1 | 5/2003 | Young |
| 6,571,233 | B2 | 5/2003 | Beavin et al. |
| 6,594,653 | B2 | 7/2003 | Colby et al. |
| 6,598,038 | B1 | 7/2003 | Guay et al. |
| 6,615,223 | B1 | 9/2003 | Shih et al. |
| 6,701,345 | B1 | 3/2004 | Carley et al. |
| 6,714,943 | B1 | 3/2004 | Ganesh et al. |
| 6,721,724 | B1 | 4/2004 | Galindo-Legaria et al. |
| 6,728,719 | B1 | 4/2004 | Ganesh et al. |
| 6,728,720 | B1 | 4/2004 | Lenzie |
| 6,744,449 | B2 * | 6/2004 | MacLeod et al. ............ 715/772 |
| 6,763,353 | B2 | 7/2004 | Li et al. |
| 6,804,672 | B1 | 10/2004 | Klein et al. |
| 6,816,874 | B1 | 11/2004 | Cotner et al. |
| 6,839,713 | B1 | 1/2005 | Shi et al. |
| 6,850,925 | B2 | 2/2005 | Chaudhuri et al. |
| 6,865,567 | B1 | 3/2005 | Oommen et al. |
| 6,910,109 | B2 | 6/2005 | Holman et al. |
| 6,912,547 | B2 | 6/2005 | Chaudhuri et al. |
| 6,915,290 | B2 | 7/2005 | Bestgen et al. |
| 6,931,389 | B1 * | 8/2005 | Bleizeffer et al. ............. 707/2 |
| 6,934,701 | B1 | 8/2005 | Hall, Jr. |
| 6,947,927 | B2 | 9/2005 | Chaudhuri et al. |
| 6,961,931 | B2 | 11/2005 | Fischer |
| 6,999,958 | B2 | 2/2006 | Carlson et al. |
| 7,007,013 | B2 | 2/2006 | Davis et al. |
| 7,031,958 | B2 | 4/2006 | Santosuosso |
| 7,047,231 | B2 | 5/2006 | Grasshoff et al. |
| 7,058,622 | B1 * | 6/2006 | Tedesco ......................... 707/2 |
| 7,080,062 | B1 | 7/2006 | Leung et al. |
| 7,139,749 | B2 | 11/2006 | Bossman et al. |
| 7,146,363 | B2 | 12/2006 | Waas et al. |
| 7,155,426 | B2 | 12/2006 | Al-Azzawe |
| 7,155,459 | B2 | 12/2006 | Chaudhuri et al. |
| 7,272,589 | B1 | 9/2007 | Guay et al. |
| 7,302,422 | B2 | 11/2007 | Bossman et al. |
| 7,353,219 | B2 | 4/2008 | Markl et al. |
| 2002/0073086 | A1 | 6/2002 | Thompson et al. |
| 2002/0120617 | A1 | 8/2002 | Yoshiyama et al. |
| 2002/0198867 | A1 | 12/2002 | Lohman et al. |
| 2003/0018618 | A1 | 1/2003 | Bestgen et al. |
| 2003/0065648 | A1 | 4/2003 | Driesch et al. |
| 2003/0088541 | A1 | 5/2003 | Zilio et al. |
| 2003/0093408 | A1 | 5/2003 | Brown et al. |
| 2003/0110153 | A1 | 6/2003 | Shee |
| 2003/0115183 | A1 | 6/2003 | Abdo et al. |
| 2003/0126143 | A1 | 7/2003 | Roussopoulos et al. |
| 2003/0130985 | A1 | 7/2003 | Driesen et al. |
| 2003/0135478 | A1 | 7/2003 | Marshall et al. |
| 2003/0154216 | A1 | 8/2003 | Arnold et al. |
| 2003/0177137 | A1 | 9/2003 | MacLeod et al. |
| 2003/0182276 | A1 | 9/2003 | Bossman et al. |
| 2003/0187831 | A1 | 10/2003 | Bestgen et al. |
| 2003/0200204 | A1 | 10/2003 | Limoges et al. |
| 2003/0200537 | A1 | 10/2003 | Barsness et al. |
| 2003/0229621 | A1 | 12/2003 | Carlson et al. |
| 2003/0229639 | A1 | 12/2003 | Carlson et al. |
| 2004/0002957 | A1 | 1/2004 | Chaudhuri et al. |
| 2004/0003004 | A1 | 1/2004 | Chaudhuri et al. |
| 2004/0019587 | A1 | 1/2004 | Fuh et al. |
| 2004/0034643 | A1 | 2/2004 | Bonner et al. |
| 2004/0181521 | A1 | 9/2004 | Simmen |
| 2004/0210563 | A1 | 10/2004 | Zait et al. |
| 2004/0215626 | A1 | 10/2004 | Colossi et al. |
| 2005/0033734 | A1 * | 2/2005 | Chess et al. .................... 707/3 |
| 2005/0097078 | A1 | 5/2005 | Lohman et al. |
| 2005/0097091 | A1 | 5/2005 | Ramacher et al. |
| 2005/0102305 | A1 | 5/2005 | Chaudhuri et al. |
| 2005/0119999 | A1 | 6/2005 | Zait et al. |
| 2005/0120000 | A1 | 6/2005 | Ziauddin et al. |
| 2005/0120001 | A1 | 6/2005 | Yagoub et al. |
| 2005/0125393 | A1 | 6/2005 | Yagoub et al. |
| 2005/0125398 | A1 | 6/2005 | Das et al. |
| 2005/0125427 | A1 | 6/2005 | Dageville et al. |
| 2005/0125452 | A1 | 6/2005 | Ziauddin et al. |
| 2005/0138015 | A1 | 6/2005 | Dageville et al. |
| 2005/0177557 | A1 | 8/2005 | Ziauddin et al. |
| 2005/0187917 | A1 | 8/2005 | Lawande et al. |
| 2005/0251523 | A1 | 11/2005 | Rajamani et al. |
| 2006/0004828 | A1 | 1/2006 | Rajamani et al. |
| 2006/0167883 | A1 * | 7/2006 | Boukobza .................... 707/10 |
| 2007/0038618 | A1 | 2/2007 | Kosciusko et al. |

OTHER PUBLICATIONS

Blakeley, J.A. et al. "Experiences Building the Open OODB Query Optimizer" Proceedings of the 1993 ACM SIGMOD International Conference on Management of Data (SIGMOD '93), Washington, DC, May 25-28, 1993, pp. 287-296.

Bruno, N. et al. "STHoles: A Multidimensional Workload-Aware Histogram" Proceedings of the 2001 ACM SIGMOD International Conference on Management of Data (SIGMOD '01), Santa Barbara, CA, May 21-24, 2001, pp. 211-222.

Bruno, N. et al. "Exploiting Statistics on Query Expressions for Optimization" Proceedings of the 2002 ACM SIGMOD International Conference on Data Management (SIGMOD '02), Madison, WI, Jun. 4-6, 2002, pp. 263-274.

Chaudhuri, S. "An Overview of Query Optimization in Relational Systems" Proceedings of the ACM SIGACT-SIGMOD-SIGART Symposium on Principles of Database Systems (PODS '98), Seattle, WA, Jun. 1-4, 1998, pp. 34-43.

Chaudhuri, S. et al. "Rethinking Database System Architecture: Towards a Self-Tuning RISC-style Database System" Proceedings of the 26th International Conference on Very Large Databases (VLDB 2000), Cairo, Eqypt, Sep. 10-14, 2000, pp. 1-10.

Chen, C.M. et al. "Adaptive Selectivity Estimation Using Query Feedback" Proceedings of the 1994 ACM SIGMOD International Conference on Management of Data (SIGMOD '94), Minneapolis, MN, May 24-27, 1994, pp. 161-172.

Derr, M.A. "Adaptive Query Optimization in a Deductive Database System" Proceedings of the 2nd International Conference on Information and Knowledge Management (CIKM '93), Washington, DC, Nov. 1-5, 1993, pp. 206-215.

Ganek, A.G. et al. "The dawning of the autonomic computing era" IBM Systems Journal, 2003, vol. 42, No. 1, pp. 5-18.
Gassner, P. et al. "Query Optimization in the IBM DB2 Family" Data Engineering, Dec. 1993, vol. 16, No. 4, pp. 4-18.
Getoor, L. et al. "Selectivity Estimation using Probabilistic Models" Proceedings of the 2001 ACM SIGMOD International Conference on Management of Data (SIGMOD '01), Santa Barbara, CA, May 21-24, 2001, pp. 461-472.
Gorman, T. "The Search for Intelligent Life in the Cost-Based Optimizer" Jul. 2001, v1.0, pp. 1-11.
IBM "DB2 Universal Database Slashes Administration Costs by Reducing Time Spent on Administrative Tasks by up to 65 Percent" MarketWire, Sep. 9, 2004, pp. 1-3, located at http://www.marketwire.com/mw/release_html-b1?release_id=72387.
Ives, Z.G. et al. "An Adaptive Query Execution System for Data Integration" Proceedings of the 1999 ACM SIGMOD International Conference on Management of Data (SIGMOD '99), Philadelphia, PA, Jun. 1-3, 1999, pp. 299-310.
Lightstone, S.S. et al. "Toward Autonomic Computing with DB2 Universal Database" ACM SIGMOD Record, Sep. 2002, vol. 31, No. 3, pp. 55-61.
Markl, V. et al. "LEO: An autonomic query optimizer for DB2" IBM Systems Journal, 2003, vol. 42, No. 1, pp. 98-106.
Scheuermann, P. et al. "Adaptive Algorithms for Join Processing in Distributed Database Systems" Distributed and Parallel Databases, 1997, vol. 5, pp. 233-269.
Slivinskas, G. et al. "Adaptable Query Optimization and Evaluation in Temporal Middleware" Proceedings of the 2001 ACM SIGMOD International Conference on Management of Data (SIGMOD '01), Santa Barbara, CA, May 21-24, 2001, pp. 127-138.
Valentin, G. et al. "DB2 Advisor: An Optimizer Smart Enough to Recommend Its Own Indexes" Proceedings of the 16th International Conference on Data Engineering, Feb. 29-Mar. 3, 2000, pp. 101-110.
Zilio, D. et al. "Self-Managing Technology in IBM DB2 Universal Database8" Proceedings of the 10th International Conference on Information and Knowledge Management (CIKM '01), Atlanta, GA, Nov. 5-10, 2001, pp. 541-543.
Office Action dated May 2, 2007 for U.S. Appl. No. 10/935,908.
Office Action dated Apr. 19, 2007 for U.S. Appl. No. 10/936,205.
Office Action dated Sep. 6, 2007 for U.S. Appl. No. 10/936,205.
Office Action dated Feb. 7, 2007 for U.S. Appl. No. 10/936,781.
Office Action dated Jul. 30, 2007 for U.S. Appl. No. 10/936,781.
Office Action dated Feb. 22, 2007 for U.S. Appl. No. 10/936,468.
Office Action dated Aug. 22, 2007 for U.S. Appl. No. 10/936,468.
Office Action dated Jan. 25, 2007 for U.S. Appl. No. 10/935,906.
Office Action dated Aug. 9, 2007 for U.S. Appl. No. 10/935,906.
Office Action dated Jan. 24, 2007 for U.S. Appl. No. 10/936,779.
Office Action dated Aug. 22, 2007 for U.S. Appl. No. 10/936,779.
Office Action dated Mar. 9, 2007 for U.S. Appl. No. 10/936,469.
Office Action dated Oct. 17, 2007 for U.S. Appl. No. 10/936,469.
Office Action dated Jan. 26, 2007 for U.S. Appl. No. 10/936,427.
Office Action dated Aug. 22, 2007 for U.S. Appl. No. 10/936,427.
Office Action dated Jan. 25, 2007 for U.S. Appl. No. 10/936,778.
Kabra et al., "Efficient Mid-Query Re-Optimization of Sub-Optimal Query Execution Plans", SIGMOD '98, Seattle, WA, USA, 1998, pp. 106-117.
Aboulnaga, A. et al. "Self-tuning Histograms: Building Histograms Without Looking at Data", Proceedings of the 1999 ACM SIGMOD International Conference on Management of Data, SIGMOD'99, Philadelphia, PA, 1999, pp. 181-192.
Almeida, et al., "Panasync: Dependency tracking among file copies", Proceedings of the 9th Workshop on ACM SIGOPS European Workshop: Beyond the PC: New Challenges for the Operating System, Kolding, Denmark, 2000, pp. 7-12.
Baldoni, et al., "A Communication-Induced Checkpointing Protocol that Ensures Rollback-Dependency Trackability", 27th Annual International Symposium on Fault-Tolerant Computing, FTCS-27, IEEE, 1997, pp. 68-77.
Baldoni, et al., "Rollback-Dependency Trackability: Visible Characterizations", Proceedings of the 18th Annual ACM Symposium on Principles of Distributed Computing, Atlanta, GA, 1999, pp. 33-42.
Damani, et al, "Optimistic Distributed Simulation Based on Transitive Dependency Tracking", Proceedings of the 11th Workshop on Parellel and Distributed Simulation, IEEE, 1997, pp. 90-97.
Elnozahy, "On the Relevance of Communication Costs of Rollback-Recovery Protocols", Proceedings of the 14th Annual ACM Symposium on Principles of Distributed Computing, Ottawa, Ontario, Canada, 1995, pp. 74-79.
Garcia, et al., "On the Minimal Characterization of the Rollback-Dependency Trackability Property", 21st International Conference on Distributed Computing Systems, IEEE, Apr. 16-19, 2001, pp. 342-349.
Graefe, G. "Dynamic Query Evaluation Plans: Some Course Corrections?", Bulletin of the IEEE Computer Society Technical Committee on Data Engineering, Jun. 2000, vol. 23, No. 2, pp. 3-6.
Hellerstein, J.M. et al. "Adaptive Query Processing: Technology in Evolution", Bulletin of the IEEE Computer Society Technical Committee on Data Engineering, Jun. 2000, vol. 23, No. 2, pp. 7-18.
Kabra, N. et al. "Efficient Mid-Query Re-Optimization of Sub-Optimal Query Execution Plans", Proceedings of the 1998 ACM SIGMOD International Conference on Management of Data, SIGMOD'98, Seattle, WA, 1998, pp. 106-117.
Louboutin, et al., "Comprehensive Distributed Garbage Collection by Tracking Causal Dependencies of Relevant Mutator Events", Proceedings of the 17th International Conference on Distributed Computing Systems, IEEE, May 27-30, 1997, pp. 516-525.
Perry, "Consumer Electronics", IEEE Spectrum, Jan. 1997, vol. 34, No. 1, pp. 43-48.
Sadri, "Integrity Constraints in the Information Source Tracking Method", IEEE Transactions on Knowledge and Data, Feb. 1995, vol. 7, Issue 1, pp. 106-119.
Sreenivas, et al., "Independent Global Snapshots in Large Distributed Systems", Proceedings of the 4th International Conference on High Performance Computing, IEEE, Dec. 18-21, 1997, pp. 462-467.
Ioannidis et al, "Parametric Query Optimization", Proceedings of the 18 VLDB Conference, Vancouver, BC, Canada 1992, pp. 103-114.
Office Action dated Nov. 25, 2008 for U.S. Appl. No. 10/935,906.
Office Action dated Apr. 9, 2008 for U.S. Appl. No. 10/935,906.
Office Action dated Oct. 31, 2008 for U.S. Appl. No. 10/936,779.
Office Action dated May 13, 2008 for U.S. Appl. No. 10/936,779.
Office Action dated Dec. 15, 2008 for U.S. Appl. No. 10/936,426.
Office Action dated Sep. 23, 2008 for U.S. Appl. No. 10/936,426.
Office Action dated Mar. 20, 2008 for U.S. Appl. No. 10/936,426.
Office Action dated Oct. 16, 2008 for U.S. Appl. No. 10/936,205.
Office Action dated Mar. 24, 2008 for U.S. Appl. No. 10/936,205.
Office Action dated Nov. 10, 2008 for U.S. Appl. No. 10/936,781.
Office Action dated Apr. 1, 2008 for U.S. Appl. No. 10/936,781.
Office Action dated Oct. 15, 2008 for U.S. Appl. No. 10/936,468.
Office Action dated Mar. 18, 2008 for U.S. Appl. No. 10/936,427.
Office Action dated Apr. 2, 2008 for U.S. Appl. No. 10/936,468.
Office Action dated Dec. 29, 2008 for U.S. Appl. No. 10/936,468.
Office Action dated Oct. 20, 2008 for U.S. Appl. No. 10/935,908.
Office Action dated Jul. 17, 2008 for U.S. Appl. No. 10/935,908.
Office Action dated Apr. 30, 2008 for U.S. Appl. No. 10/935,908.
Office Action dated Dec. 11, 2008 for U.S. Appl. No. 10/936,469.
Office Action dated May 29, 2008 for U.S. Appl. No. 10/936,469.
Office Action dated Oct. 8, 2008 for U.S. Appl. No. 10/936,778.
Office Action dated Jul. 24, 2008 for U.S. Appl. No. 10/936,778.
Markl et al. "Learning Table Access Cardinalities with LEO" SIGMOD '02; Jun. 3-6, 2002, p. 613.
Stillger et al. "LEO—DB2's Learning Optimizer" VLDB 2001.
Office Action dated Apr. 3, 2009 for U.S. Appl. No. 10/936,468.
Office Action dated May 11, 2009 for U.S. Appl. No. 10/935,906.
Office Action dated May 12, 2009 for U.S. Appl. No. 10/936,779.
Office Action dated Mar. 31, 2009 for U.S. Appl. No. 10/936,427.
Office Action dated May 28, 2009 for U.S. Appl. No. 10/936,469.
Office Action dated Jul. 2, 2009 for U.S. Appl. No. 10/936,778.

* cited by examiner

SQL TUNING SETS

CROSS-REFERENCE TO RELATED APPLICATIONS

This application claims the benefit of U.S. Provisional Application No. 60/500,490, filed Sep. 6, 2003, which is incorporated herein by reference in its entirety. This application is related to applications "AUTO-TUNING SQL STATEMENTS," with U.S. application Ser. No. 10/935,908, now published as U.S. Publication No. 2005/0120000 "SQL PROFILE," with U.S. application Ser. No. 10/936,205, now published as U.S. Publication No. 2005/0125452 "GLOBAL HINTS," with U.S. application Ser. No. 10/936,781, now published as U.S. Publication No. 2005/0125398 "SQL TUNING BASE," with U.S. application Ser. No. 10/936,468, now published as U.S. Publication No. 2005/0097091; "AUTOMATIC LEARNING OPTIMIZER," with U.S. application Ser. No. 10/935,906, now published as U.S. Publication No. 2005/0119999; "AUTOMATIC PREVENTION OF RUN-AWAY QUERY EXECUTION," with U.S. application Ser. No. 10/936,779, now published as U.S. Publication No. 2005/0177557; "METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER," with U.S. application Ser. No. 10/936,469, now published as U.S. Publication No. 2005/0187917; "SQL STRUCTURE ANALYZER," with U.S. application Ser. No. 10/936,426, now published as U.S. Publication No. 2005/0120001; "HIGH LOAD SQL DRIVEN STATISTICS COLLECTION," with U.S. application Ser. No. 10/936,427, now published as U.S. Publication No. 2005/0138015; "AUTOMATIC SQL TUNING ADVISOR," with U.S. application Ser. No. 10/936,778, now published as U.S. Publication No. 2005/0125427, all of which are filed Sep. 7, 2004 and are incorporated herein by reference in their entirety.

FIELD OF THE INVENTION

This invention is related to the field of electronic database management.

BACKGROUND

In a database management system, SQL statements are used to manipulate data and to retrieve data that matches certain selection criteria. A SQL statement is compiled in memory before being executed by a database engine. Though the compiled form of the SQL statement may be cached in memory for some amount of time for repeated executions, it is eventually discarded. Therefore SQL statements can be considered transient objects in a database system.

In practice, the set of SQL statements used by an application are repeatedly executed, and the same SQL statements can be frequently compiled into memory and executed. Also, some statements, when executed, place a high load on the system by consuming a large amount of system resources, which causes the system's performance to suffer. If knowledge about the frequency or load demands of certain SQL statements is available, then this knowledge can be used to tune these statements by adding controls to improve the performance of these SQL statements.

However, obtaining knowledge about the frequency or load demands for these statements is complex and sometimes impossible. For example, the number of SQL statements that are executed by a database system can be very large and thus very difficult to manage. Conventional database systems typically do not persistently store executed statements and performance information about each statement. The conventional systems are therefore unable to provide a sufficient amount of performance information about the executed statements to identify which statements are consuming a substantial amount of resources. Also, conventional database systems are unable to allow a database administrator (DBA) to filter or rank the executed statements based on their performance characteristics.

A need exists for a method to persistently store SQL statements and their performance information into a database as an object that can be used in a performance analysis such as a comparison of system performance between different time periods. Also, a need exists to identify high load SQL statements.

SUMMARY

A method of storing one or more database query language statements and performance information for each statement as a persistent database object is disclosed.

DETAILED DESCRIPTION

Overview

The embodiments of the invention are described using the term "SQL", however, the invention is not limited to just this exact database query language, and indeed may be used in conjunction with other database query languages and constructs.

A SQL tuning set (STS) is used to persistently store a set of SQL statements, along with their related performance information, as a database object which can be used to manage and tune the set of statements. The performance information for the statements that are stored in the STS includes execution measurements and execution context of each statement. The contents of the STS can be customized and processed as first class objects. For example, they can be filtered, ranked, loaded, updated, and deleted. The contents of the STS can be used to identify high load SQL statements that consume a significant amount of system resources. The identified statements can then be automatically tuned using their related performance information.

With the STS, a workload of SQL statements, including their performance environment and statistics, can be collected from multiple sources. The STS can then be analyzed to identify a relevant subset of SQL statements, such as high load statements, by filtering and ranking the statements in the workload using criteria such as performance statistics. The STS therefore provides a mechanism for capturing and managing SQL workloads. With this information about the high load statements, a tuning process can be performed to improve the execution of each statement in the STS.

In addition to targeting high load SQL statements, the SQL tuning set can also be used to, for example, capture all or a representative set of statements (high load or not) for a given application, along with their performance information, and use it to compare performance degradation after a potential change in the application environment. For example, if a user wants to upgrade the application, the database itself or change a database parameter that can affect the workload and the corresponding performance of the application, the user can capture such non high-load statements, because they might become high load after the change. The STS can therefore allow the SQL workload comparison to include their execution statistics and plans from before the change. Another example of a SQL tuning set feature is an incremental capture from these data sources, which allows DBAs to capture statements multiple times within a user-specified interval, thus reducing the probability of losing statements due to cursor aging.

Figure 1:
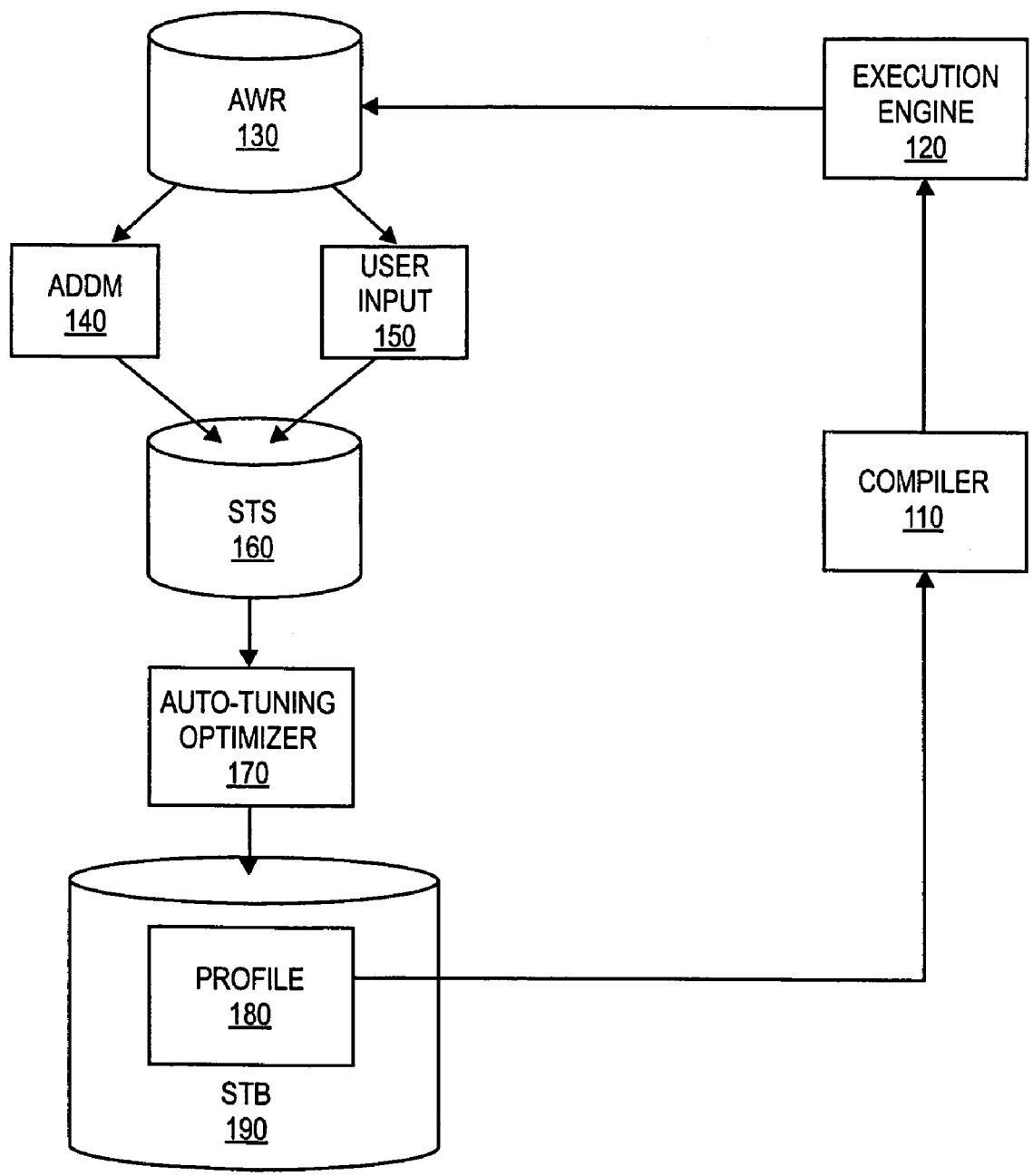
FIG. 1 shows an example of a device that can collect a STS, persistently store the STS, and provide a portion of the STS as an input to an auto-tuning optimizer.

FIG. 1 shows an example of a device that can collect a STS, persistently store the STS, and provide a portion of the STS as an input to an auto-tuning optimizer. An execution plan for a statement is received from compiler 110 and executed by engine 120. The statement, and information related to the statement, are automatically stored in a automatic workload repository (AWR) 130. The contents of the AWR can be filtered by an automatic database diagnostic monitor (ADDM) 140, to automatically select high-load statements from the AWR, or can be filtered by a user 150, to manually select statements for tuning. A set of the selected statements and their related information are used to create SQL Tuning Set 160. Each statement in the STS 160, and its related information, can be input to auto-tuning optimizer 170. The optimizer 170 generates tuning hints for the statement based on the information from the STS, and places the hints in a profile 180 that can be stored in tuning base 190. The profile can be retrieved by compiler 110 to generate a well-tuned execution plan.

Creating the STS

The problematic statements and their related information can come from several sources, including an Automatic Workload Repository (AWR), a cursor cache, another SQL tuning set, or from a customized workload created by a user. The SQL statements can also be captured or extracted from other sources like PL/SQL packages, stored procedures and also SQL trace. The AWR stores performance and system data for statements executed during a specified time period, or snapshot. Each snapshot is a persistent storage of information that provides a consistent view of the database system for the time period.

The statements stored in a snapshot of the AWR can be automatically identified by the database system via an Automatic Database Diagnostic Monitor (ADDM), based on a contribution of the statements to an overall workload of the system. The ADDM can automatically identify root causes of top performance bottlenecks and excessive resource consumption, along with the impact on the processing time of the workload. The ADDM can also provide recommendations for alleviating these burdens on the system. For example, the ADDM can identify high load statements, create a STS for the statements, and recommend that the statements in the STS are each automatically tuned. This is one example of using the SQL tuning set for automatic capture and tuning. The DBA can also decide to manually capture, process filter and rank his set of representative SQL statements, either from AWR or directly from the cursor cache, and than invoke SQL tuning advisor or compare the workload performance information with information captured during a different period.

The STS objects can also be created and managed using manual directives issued by a database administrator (DBA). This manual process can be used by the DBA to tune the response time of a subset of SQL statements for a specific function of a database application, even if that function accounts for a small percentage of the overall workload. For instance, the DBA can create a STS to store performance information for each SQL statement executed between 8 am and 5 pm on a given day having a number of fetches above a certain threshold.

Multiple SQL tuning sets can be created, where each tuning set corresponds to a different SQL workload processed by the database server. For example, after creating the STS for statements executed between 8 am and 5 pm, another STS can be created for batch queries issued between midnight and 2 am. These different SQL tuning sets can then be independently accessed by an auto-tuning optimizer to tune the SQL statements using an auto-tune process.

Contents of the STS

The information stored for each statement in the STS can include metadata for the STS and the SQL statements stored in the STS, such as a STS name, owner. The STS name uniquely identifies the STS for a particular user (STS owner). The information stored in the STS also includes performance information for each statement, such as execution context and execution statistics. This allows the optimizer to consider the runtime environment of each statement during the tuning process. This information can also be used during SQL workload comparison.

The execution context can include a user schema, a name and action of the application program issuing the statement, a list of bind values, and system environment information. The name and an action attribute of the application for the statement can be used by a consumer of the STS as a filter. The system environment information can include a set of optimizer related initialization parameters for the executed statement.

The execution statistics can include averages for statistics such as the number of buffer gets, disk reads, rows processed, and executions performed, can be built from the source and stored in the STS. An optimizer cost field in the STS stores the cost of the execution plan for the statement. An object list includes a list of objects accessed by the statement. Time information related to the statement can include a last execution time, which is the last time the statement was executed during the population period. Also, the time information can include the time period during which the execution statistics were created. The content of the SQL tuning set can also include multiple execution plans for the statements. For example, the SQL tuning set can capture and store multiple plans for a given statement. The STS can also include the list of objects referenced within a SQL statement.

Manipulating the Content of the STS

The content of the STS can be processed by functions such as insert new or additional information, updating existing information, computing missing information, delete information, rank the information, or perform queries on the information. Thus, the STS can be treated as a table having rows of SQL statements and columns of attributes. For example, a filter can be applied to a STS to select a desired subset of SQL statements, such as high load statements. The filter may be a relational expression used as a where clause on one or more execution statistics or context fields of the STS or any combination of them. The ranking measurement can be an order-by clause on the SQL statements. The statements can be filtered with multiple ranking measurements, which reduce or prevent ties between statements.

An arithmetic expression on execution statistics, such as cpu time, buffer gets, disk reads, elapsed time, executions, rows processed, optimizer cost, last execution date for example, can be used as the ranking filter. The ranking filter can rank the statements based on the ranking measurement, then can select the "top N" statements for this measurement. A "top N" predicate which is a constant number is provided to specify a result limit L of top statements. A percentage P filter is also provided to represent a percentage on the sum of a ranking measurement and can be used to select the top SQL statements that contribute to P percent of the overall sum. The limit L is used to select the top L SQL statements from the filtered source, as ranked by the ranking measurement. If both a limit L and a percentage P of top statements are specified, then the top SQL statements that contribute to P percent of the sum on the ranking measure, up to a maximum of L statements, are returned.

For instance, a set of SQL statements can be ordered using cpu time as the ranking measurement. The subset of these statements which contribute to 90 percent of the total cpu time in the set of statements can be selected. A result limit of 5 statements can be used to return no more than 5 statements of the subset.

Figure 2:
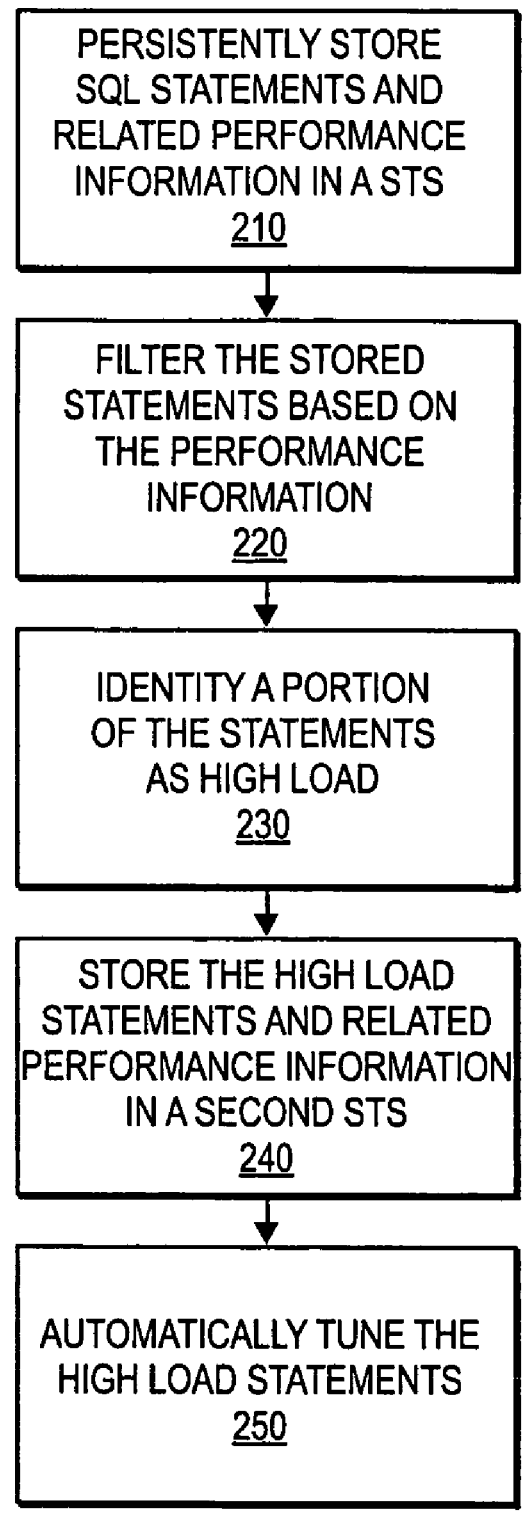
FIG. 2 shows an example of creating and using SQL tuning sets.

FIG. 2 shows an example of creating and using SQL tuning sets. One or more SQL statements, and performance information for each SQL statement, are gathered from a source and stored in a STS as a persistent database object, 210. The SQL statements in the STS are filtered based on the performance information, 220. A portion of the filtered statements are identified as resource intensive statements, 230. The identified resource intensive statements and the performance information for each resource intensive statement are stored in a second STS as a second persistent database object, 240. Then, an auto-tuning process can be used for automatically tuning each statement in the second persistent database object 250, as discussed in the following example.

Using the STS to Automatically Tune High Load Statements

An example of a method of using the STS to perform automatic tuning can include creating the STS, populating the STS, filtering high load statements in the STS, tuning the high load statements in the STS, then dropping the STS. For example, if a DBA wants to reduce an I/O bottleneck on the system during peak hours, SQL statements that are I/O intensive can be tuned. First, a STS is created for the I/O intensive workload by specifying a name, such as 'I/O peak' and description, such as 'I/O intensive workload on April 10 from 8 am to 11 am.'

After creating the STS, it is populated with the desired SQL statements and their performance statistics from one of the sources. The STS can be populated with I/O intensive statements from the workload repository or directly from the cursor cache during the peak period. One or more filters can be used to identify the I/O intensive statements in the workload repository and place them in the STS. SQL statements that have been executed for example, at least ten times and have a disk-read/buffer-get ratio greater than 50percent for the peak period are chosen. These statements can then be ordered by (disk-read/buffer-get). The top 30 statements can be selected to populate the STS.

Once the STS is created and populated, the DBA can browse through the STS and select some of the statements for further review. For example, each statement with a (disk-reads/buffer-gets) ratio >75 percent can be marked to have a high priority comparing to the rest of statements in the SQL tuning set.

The unmarked statements can be deleted from the STS. Then, for each statement in the STS, an auto-tuning optimizer can be for example used to read the statement from the STS, analyze the statement, and automatically generate tuning actions for the statement. The tuning actions can be placed in a SQL profile and stored in a tuning base. Then, when the statement is compiled, the profile for the statement can be retrieved from the tuning base and used to generate an execution plan. In this example, the tuning information in the profile allows the compiler to generate an execution plan that reduces the I/O bottleneck of the system. After each statement in the STS is tuned, the STS can be dropped.

Figure 3:
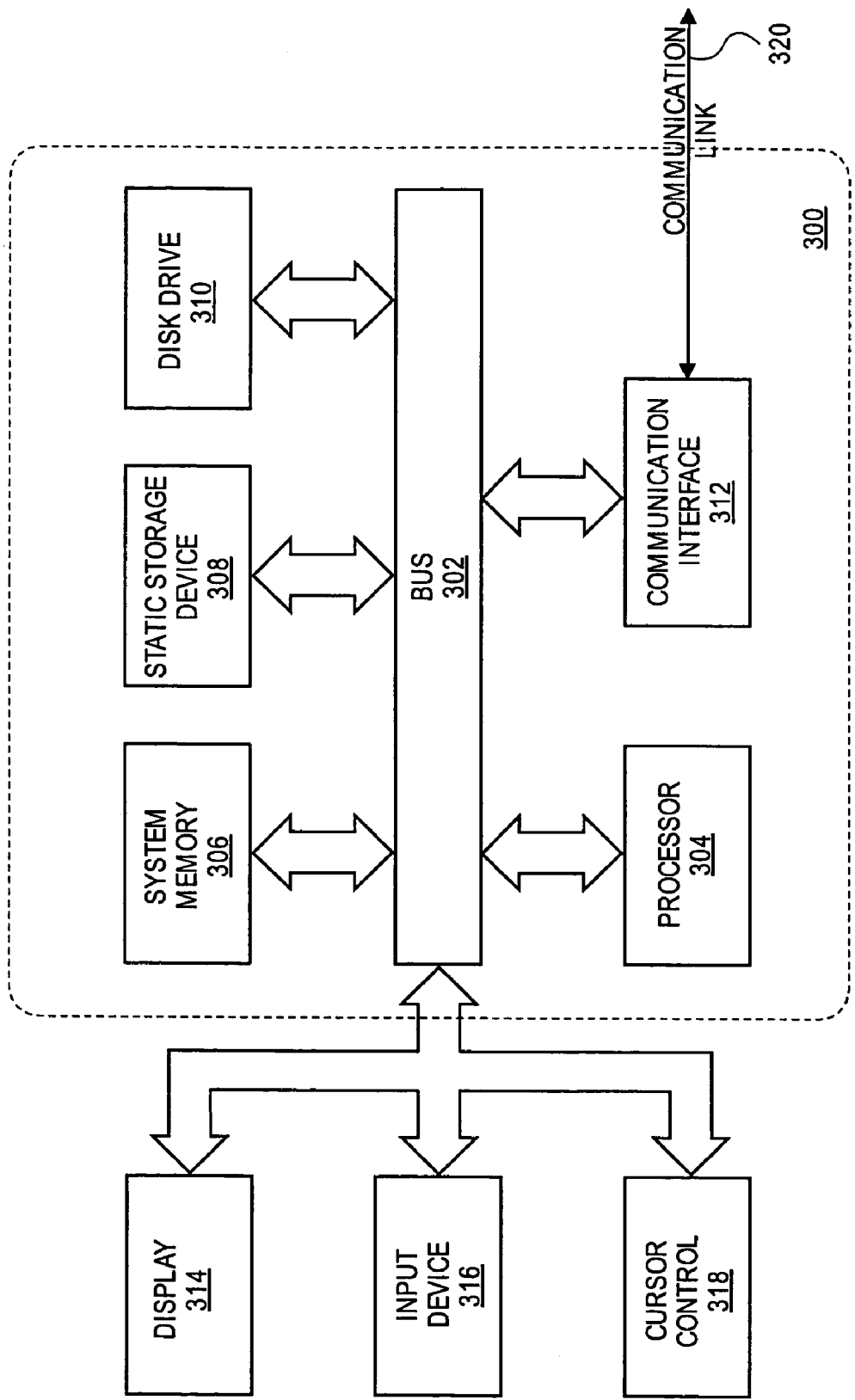
FIG. 3 is a block diagram of a computer system suitable for implementing an embodiment of SQL Tuning Sets.

FIG. 3 is a block diagram of a computer system 300 suitable for implementing an embodiment of SQL Tuning Sets. Computer system 300 includes a bus 302 or other communication mechanism for communicating information, which interconnects subsystems and devices, such as processor 304, system memory 306 (e.g., RAM), static storage device 308 (e.g., ROM), disk drive 310 (e.g., magnetic or optical), communication interface 312 (e.g., modem or ethernet card), display 314 (e.g., CRT or LCD), input device 316 (e.g., keyboard), and cursor control 318 (e.g., mouse or trackball).

According to one embodiment of the invention, computer system 300 performs specific operations by processor 304 executing one or more sequences of one or more instructions contained in system memory 306. Such instructions may be read into system memory 306 from another computer readable medium, such as static storage device 308 or disk drive 310. In alternative embodiments, hard-wired circuitry may be used in place of or in combination with software instructions to implement the invention.

The term "computer readable medium" as used herein refers to any medium that participates in providing instructions to processor 304 for execution. Such a medium may take many forms, including but not limited to, non-volatile media and volatile media. Non-volatile media includes, for example, optical or magnetic disks, such as disk drive 310. Volatile media includes dynamic memory, such as system memory 306.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 300. According to other embodiments of the invention, two or more computer systems 300 coupled by communication link 320 (e.g., LAN, PTSN, or wireless network) may perform the sequence of instructions to practice the invention in coordination with one another. Computer system 300 may transmit and receive messages, data, and instructions, including program, i.e., application code, through communication link 320 and communication interface 312. Received program code may be executed by processor 304 as it is received, and/or stored in disk drive 310, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

We claim:

1. A computer implemented method, comprising:
populating a plurality of database query language statements and corresponding performance information as a plurality of first persistent database objects in a database;
identifying, by using a processor, one or more database query language statements from the plurality of database query language statements and performance information for the one or more data base query language statements, wherein
the plurality of database query language statements are filtered based at least in part upon identification of the one or more high load database query language statements such that the set of the one or more high load query statements are identified by ranking and selecting the one or more database query language statements from the set of one or more high load query statements, in which at least one of the set of the one or more high load database query language statements are tuned by using at least a part of the performance information;
persistently storing the one or more database query language statements and a first performance information as one or more second persistent database objects, wherein
the first performance information is used to tune one of the one or more database query language statements as at least some of the one or more second persistent database objects,
the first performance information comprises execution measurements and execution context corresponding to the one or more database query language statements, and
the execution context comprises at least one of a user schema, a name of an application issuing a query language statement, an action of an application issuing a query language statement, a list of bind variables, and system environment information.

2. The method of claim 1, further comprising:
filtering the statements based on the performance information.

3. The method of claim 2, further comprising:
identifying a portion of the filtered statements as resource intensive statements.

4. The method of claim 3, further comprising:
storing the resource intensive statements and the performance information for each resource intensive statement as a second persistent database object.

5. The method of claim 4, further comprising:
automatically tuning each of the one or more database query language statements in the second persistent database object.

6. The method of claim 1, wherein the database query language statements are SQL statements.

7. An apparatus, comprising:
means for populating a plurality of database query language statements and corresponding performance information as a plurality of first persistent database objects in a database;
a processor configured for identifying one or more database query language statements from the plurality of database query language statements and performance information for the one or more data base query language statements, wherein
the plurality of database query language statements are filtered based at least in part upon identification of the one or more high load database query language statements such that the set of the one or more high load query statements are identified by ranking and selecting the one or more database query language statements from the set of one or more high load query statements, in which at least one of the set of the one or more high load database query language statements are tuned by using at least a part of the performance information;
means for persistently storing the one or more database query language statements and performance information as one or more second persistent database objects, wherein
the performance information is used to tune one of the one or more database query language statements as at least some of the one or more second persistent database objects,
the performance information comprises execution measurements and execution context corresponding to the one or more database query language statements, and
the execution context comprises at least one of a user schema, a name of an application issuing a query language statement, an action of an application issuing a query language statement, a list of bind variables, and system environment information.

8. The apparatus of claim 7, further comprising:
means for filtering the statements based on the performance information.

9. The apparatus of claim 8, further comprising:
means for identifying a portion of the filtered statements as resource intensive statements.

10. The apparatus of claim 9, further comprising:
means for storing the resource intensive statements and the performance information for each resource intensive statement as a second persistent database object.

11. The apparatus of claim 10, further comprising:
means for automatically tuning each statement in the second persistent database object.

12. The apparatus of claim 7, wherein the database query language statements are SQL statements.

13. A computer readable medium storing a computer program of instructions which, when executed by a processing system, cause the processing system to perform a process, the process comprising:
populating a plurality of database query language statements and corresponding performance information as a plurality of first persistent database objects in a database;
identifying, by using a processor, one or more database query language statements from the plurality of database query language statements and performance information for the one or more data base query language statements, wherein
the plurality of database query language statements are filtered based at least in part upon identification of the one or more high load database query language statements such that the set of the one or more high load query statements are identified by ranking and selecting the one or more database query language statements from the set of one or more high load query statements, in which at least one of the set of the one or more high load database query language statements are tuned by using at least a part of the performance information;

persistently storing the one or more query language statements and a first performance information as one or more second persistent database objects, wherein the first performance information is used to tune one of the one or more database query language statements as at least some of the one or more second persistent database objects, the first performance information comprises execution measurements and execution context corresponding to the one or more database query language statements, and the execution context comprises at least one of a user schema, a name of an application issuing a query language statement, an action of an application issuing a query language statement, a list of bind variables, and system environment information.

14. The medium of claim 13, wherein the computer program, when executed, further performs the method comprising:

filtering the statements based on the performance information.

15. The medium of claim 14, wherein the computer program, when executed, further performs the method comprising:

identifying a portion of the filtered statements as resource intensive statements.

16. The medium of claim 15, wherein the computer program, when executed, further performs the method comprising:

storing the resource intensive statements and the performance information for each resource intensive statement as a second persistent database object.

17. The medium of claim 16, wherein the computer program, when executed, further performs the method comprising:

automatically tuning each statement in the second persistent database object.

18. The medium of claim 13, wherein the query language statements are SQL statements.

19. The method of claim 1, further comprising:

filtering the statements based on one or more user-specified criteria; and storing the filtered statements and the performance information for each filtered statement as a third persistent database object.

20. The method of claim 19, wherein the user-specified criteria comprise one selected from the group consisting of: a representative set of statements for a given application, all statements for a given application, and incremental capture.

21. The computer implemented method of claim 1, further comprising:

determining whether a second database query language statement is to be persistently stored due to a future change to the database, wherein the second database query language statement is determined not to be persistently stored as the one or more database query language statements before an implementation of the future change.

* * * * *

UNITED STATES PATENT AND TRADEMARK OFFICE
CERTIFICATE OF CORRECTION

PATENT NO. : 7,664,778 B2
APPLICATION NO. : 10/936449
DATED : February 16, 2010
INVENTOR(S) : Khaled Yagoub et al.

It is certified that error appears in the above-identified patent and that said Letters Patent is hereby corrected as shown below:

Title page item [56] on page 2, in column 2, under "Other Publications", line 20, delete "Eqypt," and insert -- Egypt, --, therefor.

Title page item [56] on page 3, in column 2, under "Other Publications", line 6, delete "Parellel" and insert -- Parallel --, therefor.

In column 1, line 9, after "to" insert -- co-pending --.

In column 1, line 11, after "2005/0120000" insert -- ; --.

In column 1, line 13, after "2005/0125452" insert -- ; --.

In column 1, line 15, after "2005/0125398" insert -- ; --.

In column 3, line 23, delete "a" and insert -- an --, therefor.

In column 5, line 61, delete "50percent" and insert -- 50 percent --, therefor.

In column 7, line 13, in claim 1, delete "data base" and insert -- database --, therefor.

In column 7, line 66, in claim 7, delete "data base" and insert -- database --, therefor.

In column 8, line 56, in claim 13, delete "data base" and insert -- database --, therefor.

Signed and Sealed this
Twenty-eighth Day of December, 2010

David J. Kappos
*Director of the United States Patent and Trademark Office*